(No Model.)
M. E. PORTER.
COOKING ATTACHMENT FOR OIL STOVES.
No. 268,935. Patented Dec. 12, 1882.
Fig: 1.
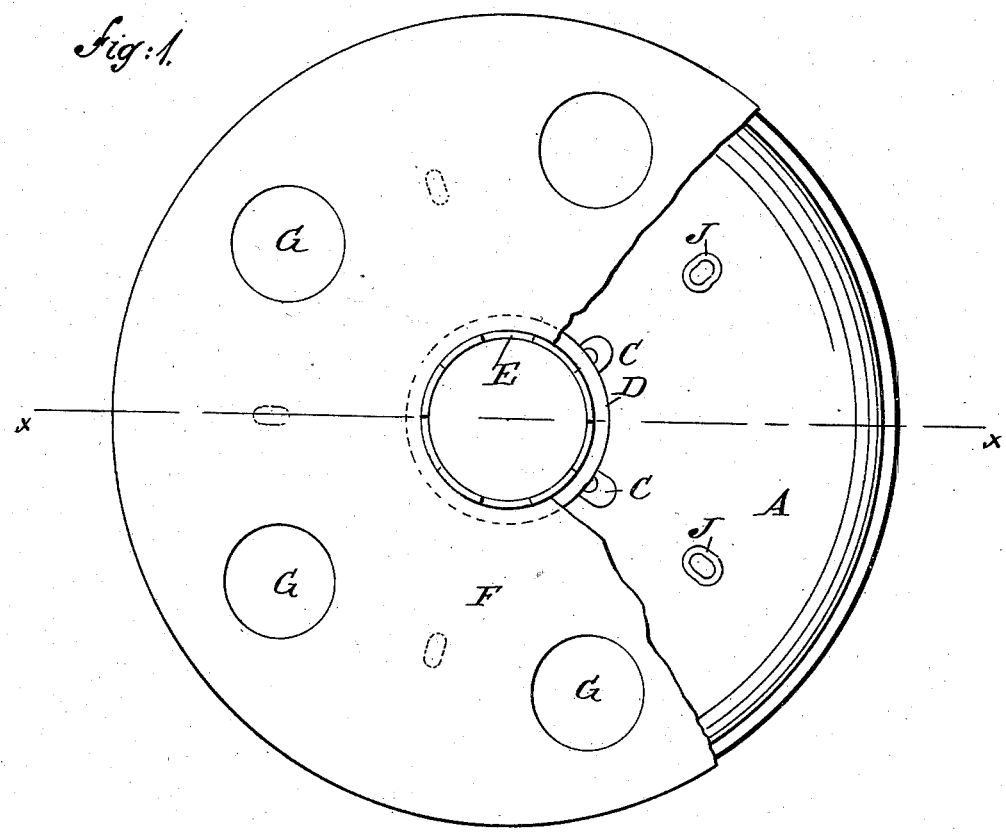
Fig: 2.
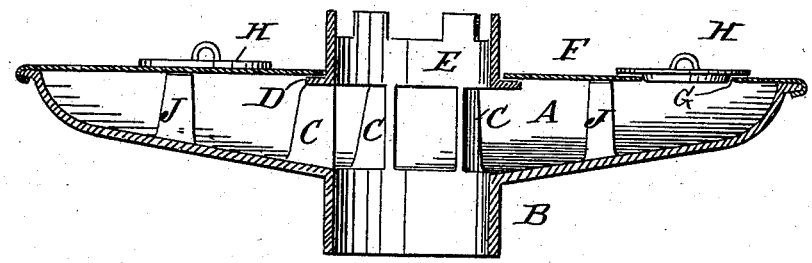
WITNESSES:
INVENTOR:
M. E. Porter
BY Munn & Co
ATTORNEYS.

United States Patent Office.

MARION E. PORTER, OF LEON, IOWA.

COOKING ATTACHMENT FOR OIL-STOVES.

SPECIFICATION forming part of Letters Patent No. 268,935, dated December 12, 1882.

Application filed September 20, 1882. (No model.)

*To all whom it may concern:*

Be it known that I, MARION E. PORTER, of Leon, in the county of Decatur and State of Iowa, have invented a new and Improved Cooking Attachment for Oil-Stoves, of which the following is a full, clear, and exact description.

The object of my invention is to provide a new and improved attachment for oil-stoves, whereby a greater quantity of food can be cooked on an oil-stove.

Reference is to be had to the accompanying drawings, forming part of this specification, in which similar letters of reference indicate corresponding parts in both the figures.

Figure 1 is a plan view of my improved attachment for oil-stoves, parts being broken out. Fig. 2 is a cross-sectional elevation of the same on the line $x\ x$, Fig. 1.

A flat cup-shaped heat-transmitter, A, is provided at its middle with a downwardly-projecting collar, B, which is adapted to pass into the top opening of an oil-stove. Around the rim of the said collar a series of supports, C, project upward from the upper or inner surface of the heat-transmitter A, and are connected at their upper ends by a horizontal ring or flange, D, from which a collar, E, projects upward, which has its upper edge toothed or notched. The upper surface of the flange D is flush with the upper surface of the rim of the heat-transmitter A. An annular top, F, which can be made of sheet iron, Russian iron, ordinary tin, or of cast-iron, rests on the rim of the vessel A, the flange D, and a series of supports, J, arranged in a circle and projecting from the inner surface of the heat-transmitter A. The top F is provided with a series of openings, G, which can be closed by covers H, so that the openings which are not closed by cooking-vessels can be closed by the covers H, whereby the surplus heat of the oil-stove will be retained within the vessel A. The vessels on the top F will thus be heated and their contents cooked. A heat-transmitter can also be placed on the collar E, the heat passing through the notches in the upper edge of the said collar E. A great part of the surplus heat of the oil-stove is thus saved, and a considerable quantity of oil is economized.

The attachment can also be constructed on a small scale for lamps, or can be made for gas-stoves.

The heat-transmitter A, the collar B, the standards C, the collar E, and the standards J are preferably cast as one piece.

If desired, the covers H may be pivoted to the top F, to be swung upon or off the openings G, and the collar E, instead of being notched at its top edge, may have a continuous upper edge, and the necessary vent-holes be provided through the body of the collar, as will readily be understood.

Having thus fully described my invention, I claim as new and desire to secure by Letters Patent—

1. The heat-transmitter A for an oil-stove, provided with a series of top openings, G, and one central opening and two central collars, B E, projecting respectively in opposite directions and connected by supports C, between which are openings into the body of the transmitter, as shown and described, whereby the heated air and products of combustion will be diffused throughout the transmitter.

2. In an oil-stove heat-transmitter, the cover F, combined centrally with a supporting-flange, D, on the bottom of collar E, and held at the periphery on a rim-flange of the body of the transmitter, as described.

3. The combination, with the cover supported at its center and circumference, of the intermediate supports, J, arranged substantially as shown and described.

4. In an oil-stove attachment, the combination, with the heat-transmitter A, having a collar, B, of the supports C, the collar E, the supports J, and the top F, substantially as herein shown and described, and for the purpose set forth.

MARION E. PORTER.

Witnesses:
I. F. HILDRETH,
J. D. ROBBERTS.